April 1, 1969 A. LÖHR ET AL 3,435,754

ROASTING AND BROILING APPARATUS

Filed May 23, 1967

INVENTORS:
Alfred Löhr
Helmut Hemmann
Karl Tropp

BY Karl F. Ross
Attorney

April 1, 1969  A. LÖHR ET AL  3,435,754
ROASTING AND BROILING APPARATUS
Filed May 23, 1967

INVENTORS:
Alfred Löhr
Helmut Hemmann
Karl Tropp

BY Karl F. Ross
Attorney

United States Patent Office 3,435,754
Patented Apr. 1, 1969

3,435,754
ROASTING AND BROILING APPARATUS
Alfred Löhr and Helmut Hemmann, Herborn, and Karl Tropp, Werdorf, Germany, assignors to Burger Eisenwerke Aktiengesellschaft, Wetzlar, Germany, a corporation of Germany
Filed May 23, 1967, Ser. No. 640,534
Claims priority, application Germany, May 25, 1966, B 87,277
Int. Cl. A47j 37/00
U.S. Cl. 99—341                                    6 Claims

ABSTRACT OF THE DISCLOSURE

A meat-roasting and meat-broiling apparatus having an upright support with a plurality of axially spaced and angularly offset station for receiving the pieces of meat, a support carrying these stations for rotating them about a vertical axis, and an upright housing provided with an access door in the side thereof. The support is formed as a drum-like cage with vertical bars supporting the stations and surrounding a central heating means. On at least one side of the cage, a viewing opening is provided in the housing which also has a mirror permitting a view of the comestible products from the exterior of the apparatus.

Specification

Our present invention relates to an apparatus for the roasting, broiling and baking of comestibles and, especially, the roasting of meat.

In institutional and other large-scale or gross cooking, it is a common practice to roast numerous portions of meat simultaneously and uniformly upon spits carried by a chain along a closed transport path between a pair of heating elements. In alternative arrangements, the pieces of meat may be provided in baskets or the like hung from the vertically or horizontally moving chains. In many cases, these devices do not afford sufficient control of the roasting operation, make it difficult to insert and remove the portions of meat, are hard to clean and are inconvenient to use. Furthermore, the transport mechanisms of such systems are fraught with complications arising from contamination of moving parts, accumulation of waste substances released in the roasting process, or the like. In addition, it is a common problem that a uniform roasting of the meat does not occur.

It is, therefore, the principal object of the present invention to provide an improved apparatus for the roasting of numerous portions of meat whereby the aforementioned disadvantages can be avoided and which permits the portions to be handled and observed with ease.

A further object of our invention is to provide a relatively inexpensive and simple apparatus with low special requirements for the institutional or large-scale roasting, baking or broiling of meat.

We have found that these objects can be attained economically by providing an apparatus in which the transport means comprises an upright cage which is rotated about its vertical axis by an electric-motor drive, the cage surrounding, in turn, a central heating means which also is centered upon this axis. According to an important feature of this invention, the generally upright housing surrounds and preferably is coaxial with the cage, while having an access opening along a vertical wall of this housing, the opening having a width equal to a major fraction of the inner diameter of the housing and an axial height at least equal to the height of the part of the cage carrying the meat. The cage is, therefore, provided radially outwardly of the central heating means with a multiplicity of stations which may receive several portions of meat per stage in angularly spaced relationship, the stages being vertically (i.e., axially) spaced apart from one another along the cage. Thus, the stages may be formed by angularly spaced or offset sectoral platforms which project radially outwardly from the vertical support bars of the cage or by angular platforms mounted upon and surrounding these bars. The stages may be nonperforated plates or of wire or other perforate construction so as to permit the passage of roasting juices downwardly from stage to stage, thereby treating the lowermost portions of meat with the hot juices released from the uppermost portions in an automatic basting action.

Around at least a major part of the periphery of the support means, and outwardly of the aforementioned stages and their rotational path, we provide further means for heating the meat. Such means may include deflectors or burners directing hot gases outwardly and upwardly past the stages prior to the discharge of such gases from the housing, when gas-flame burners are employed as heating means. Advantageously, at least one axially extending burner tube passes completely through the cage and is composed of a refractory but heat-conductive material so that, along the inner wall of the cage, the burner tube forms a radiant-heating body or heating means. This tube opens remote from the fuel nozzle, close to the lower end of the cage, beyond the last of the support stages and co-operates with deflector means for turning the hot gases outwardly and upwardly. At the upper end of the housing vent means is provided for discharging the depleted cooking medium, advantageously at a multiplicity of locations spaced around the cage and the central burner.

According to another aspect of this invention, the central heating means surrounded by the cage comprises a nest of vertically extending, angularly equispaced electric-resistance heating elements which radiate infrared heat outwardly toward the meat carried by the support platforms. A similar array of electric heating elements is disposed about the periphery of the closed transport path, advantageously over at least 180° of the swing of the platforms and that portion of the path which is remote from the door of the device. At its upper end, the cage may be provided with a support ring surrounding the inner heating means and to which the vertical rods or bars of the cage are anchored.

The above and other objects, features and advantages of the present invention will become more readily apparent from the following description, reference being made to the accompanying drawing in which.

Figure 1:
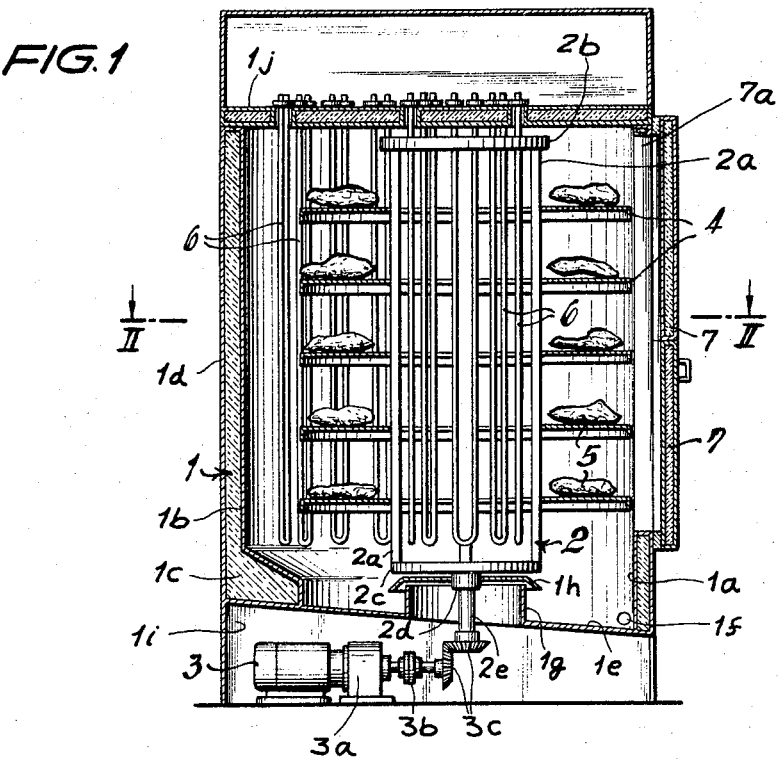
FIG. 1 is an axial cross-sectional view of a roasting apparatus according to this invention provided with electric-heating means.
Figure 2:
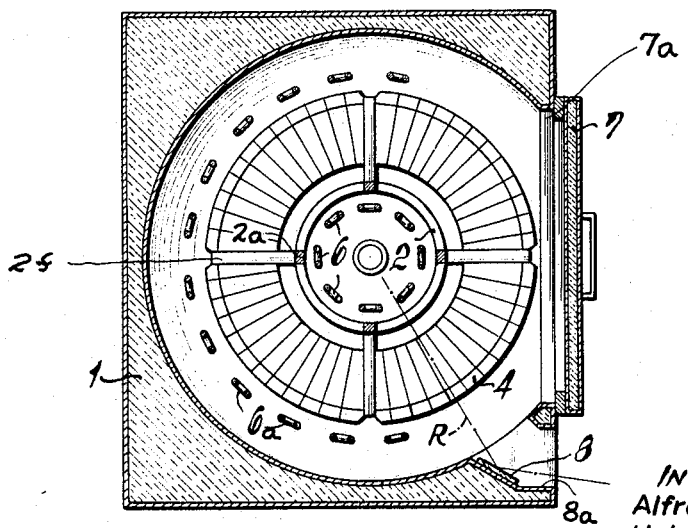
FIG. 2 is a cross-sectional view taken generally along the line II—II of FIG. 1.

In FIGS. 1 and 2 of the drawing, we show an apparatus for the simultaneous roasting, baking or broiling of a plurality of pieces 5 of meat, which comprises an upright housing 1, whose inner, generally cylindrical chamber 1a is formed with a metallic wall 1b surrounded by a layer 1c of electrical insulation and an outer wall 1d. The floor of the chamber 1a has a downwardly inclined pan 1e at the base of which the juices produced during the broiling or roasting process are collected and can be led from the device via an outlet 1f.

The floor 1e of the chamber is provided centrally with an upright sleeve 1g overlain by a horizontal apron 1h connecting the chamber 1a with the exterior via a compartment 1i below the floor 1e.

The portions 5 of the meat are carried upon a support cage generally designated 2 and formed by a multiplicity of angularly spaced vertical bars 2a which are rigid with a pair of terminal rings or disks 2b and 2c, the latter being connected with a hub 2d and driven by a vertical shaft 2e as will be described in greater detail hereinafter. The ring 2b at the upper end of the cage 2 surrounds an annular nest of heating elements 6. The drumlike cage 2 and the shaft 2e are coaxial with the chamber 1a and the wall 1b of the housing and are journaled in the apron 1h coaxially with the array of inner heating elements 6 which lie within the edge.

The heating elements 6 are angularly equispaced about the axis of the device within the cage 2 and generally are of U-shaped configuration with relatively long shanks lying parallel to the axis of the device. Furthermore, these heating elements may depend from the roof 1j of the housing and have an axial length sufficient to permit them to extend beyond the lowermost platform 4. The annular platforms 4 are mounted on the bars 2a of the cage via radial supports 2f and extend radially outwardly from the cage while lying in respective horizontal planes which are vertically and axially spaced apart along this cage to receive, with angular spacing, a plurality of pieces 5 of the meat. The cage 2 and the platforms 4 are driven by a motor 3 via a speed-reducing gear 3a, a slip clutch 3b and a bevel-gear transmission 3c. The slip clutch 3b permits the cage and the platforms to be temporarily immobilized for emplacing the pieces on the platforms and removing them therefrom without straining the motor 3 which is located in the compartment 1i.

Outwardly of the platforms 4, a further sectional array of heating elements 6a is provided These heating elements, which likewise depend from the room 1j of the housing, are angularly equispaced over a major portion of the periphery of the drum and the angular path of the meat carried thereby, i.e. they extend beyond 180° C. therearound. At the right-hand side of the apparatus (FIGS. 1 and 2), remote from the outer heating elements 6a which extend parallel to the axis of rotation coaxially with the drum, we provide an access opening 7a whose width (FIG. 2) is at least equal to a major fraction of the diameter of the platforms 4 and whose height (FIG. 1) exceeds the axial spread of the platforms 4. A pair of doors 7 serve to close the opening 7a and permit introduction and removal of the pieces of meat. To permit observation of the meat within the device, an observation port 8a (in the form of a vertical slot) is provided adjacent one or both of the vertical sides of the door 7 and extends substantially the full length of the cage. Ahead of this observation port 8a, there is provided a vertically elongated mirror 8 which is inclined to the plane of the opening 7a and to the radial direction R permitting the operator to observe the meat as it rotates past the port 8a. It will be noted that the outer heating elements 6a lie about an arc which terminates short of the door aperture 7a and the observation slot 8a.

Figure 3:
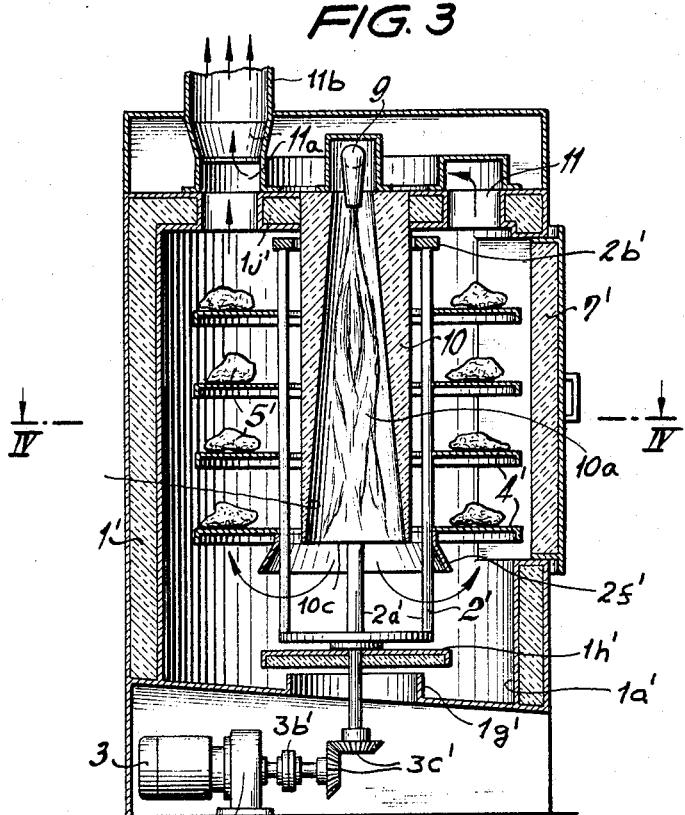
FIG. 3 is an axial cross-sectional view of a gas-heated broiling and roasting apparatus.
Figure 4:
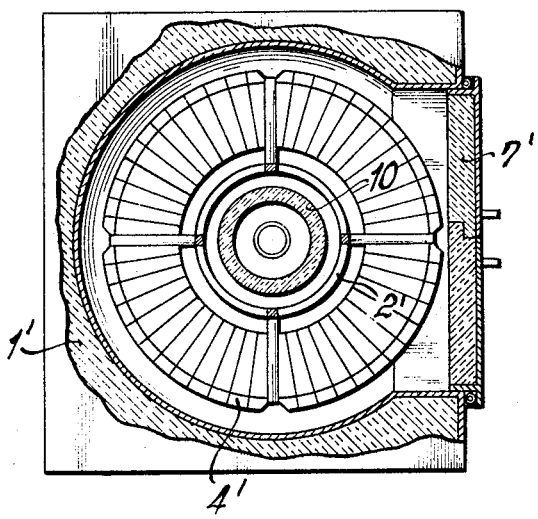
FIG. 4 is a cross-sectional view taken along the line IV—IV of FIG. 3.

In FIGS. 3 and 4, we show a somewhat modified system in which the housing 1' of double-walled, insulated construction is provided with a gas burner as a heating means. In this case, the cage 2' is driven by the motor 3' via a reducing gear 3a', a slip clutch 3b' and a bevel-gear transmission 3c' while being supported in a horizontal plate 1h' overlying the sleeve 1g'. The upper ring 2b' of the cage 2' and the bars 2a' thereof surround an axially extending burner tube 10 of clay or other refractory material which is heated by the flame 10a and radiates heat outwardly against the pieces 5' of meat carried by the platforms 4' on the cages 2'. The tube 10 forms a combustion chamber 10b which diverges frustoconically from the roof 1j' of the housing from which the tube 10 depends. The mouth 10c of the stationary tube 10 extends into a downwardly converging deflection apron 2f' which deflects the hot gases and flame 10a outwardly around and beneath the platforms 4' and into thte regions of the chamber 1a' alongside these platforms. At the upper end of the housing, we provide a multiplicity of angularly equispaced discharge ports or vents 11 in the roof 1j' these discharge ports communicating with an annular manifold 11a and an exhaust duct 11b provided with forced-shaft means such as a suction blower. Furthermore, the upper end of the housing is provided at 9 with a gas/air burner which discharges a jet of flame 10a downwardly along the tube. A bipartite door 7' affords access to the platforms. The apparatus of FIGS. 3 and 4, of course, operates generally in the manner described generally in connection with FIGS. 1 and 2.

We claim:

1. An apparatus for the roasting and broiling of portions of meat, comprising an upright housing forming a cooking chamber; a supporting cage rotatable in said chamber about an upright axis and with radially outwardly extending supports for receiving the portions of meat, said housing having a top overlying said cage; drive means for rotating said cage; and heating means in said chamber for subjecting the portions of meat carried by said cage to an elevated temperature, said heating means incluing a ceramic tube depending from said top along said axis and opening at its lower end into said chamber below said supports, said heating means further including a burner extending into said tube at the upper end thereof and exhaust means at the upper end of said chamber for the evacuation of combustion gases therefrom, thereby subjecting the portions of meat carried by said supports to treatment with hot gases.

2. An apparatus as defined in claim 1 wherein said exhaust means comprises a set of angularly equispaced discharge ports on said top overlying the path of said {supports.

3. An apparatus as defined in claim 1 wherein said supports are annular platforms vertically stacked along said axis.

4. An apparatus for the roasting and broiling of portions of meat, comprising an upright housing forming a cooking chambe; a cage rotatable in said chamber about an upright axis and provided with radially outwardly extending supports for receiving the portions of meat, said housing having a top overlying said cage and further having a wall provided with a vertically extending observation port; drive means for rotating said cage; heating means in said chamber for subjecting the portions of meat carried by said cage to an elevated temperature, said heating means including at least one radiant heater extending through the interior of said cage paralle to said axis; and a vertically extending elongated mirror mounted in said slot at an inclination to the radial direction for permitting viewing of the portions of meat on said supports.

5. An apparatus as defined in claim 4 wherein said wall is provided with an access aperture alongside said slot and with door means for selectively opening and closing said aperture.

6. An apparatus as defined in claim 5 wherein said heating means comprises an inner annular array of angularly equispaced heaters coaxially surrounded by said cage and an outer array of angularly spaced heating elements disposed around the path of said supports along an arc terminating short of said access aperture and said slot.

References Cited

UNITED STATES PATENTS 1,358,365  11/1920  De Matteis _____ 99—391

(Other references on following page)

| | | |
|---|---|---|
| 1,631,655 | 6/1927 | Sunderland et al. |
| 1,716,653 | 6/1929 | Morrow _____ 99—427 |
| 1,762,035 | 6/1930 | Soylian. |
| 2,372,362 | 3/1945 | Dawson _____ 99—443 XR |
| 2,456,291 | 12/1948 | Malone _____ 99—386 XR |
| 2,517,360 | 8/1950 | Singer. |
| 2,537,378 | 1/1951 | Stalfare _____ 99—386 XR |
| 2,831,420 | 4/1958 | Radman _____ 99—427 XR |
| 2,945,598 | 7/1960 | Rallis _____ 99—443 XR |

FOREIGN PATENTS 584,803  10/1959  Canada.

WALTER A. SCHEEL, Primary Examiner.

JOHN M. NEARY, Assistant Examiner.

U.S. Cl. X.R.

99—386, 423, 443, 447